US011445386B2

(12) United States Patent
Kumar et al.

(10) Patent No.: US 11,445,386 B2
(45) Date of Patent: Sep. 13, 2022

(54) DISTRIBUTED WI-FI NETWORK VISUALIZATION AND TROUBLESHOOTING

(71) Applicant: Plume Design, Inc., Palo Alto, CA (US)

(72) Inventors: Abhishek Kumar, Hayward, CA (US); Adam Hotchkiss, Burlingame, CA (US); Srinivasa Tagirisa, Cupertino, CA (US); Aman Singla, Saratoga, CA (US); Kiran Edara, Cupertino, CA (US); Balaji Rengarajan, Campbell, CA (US); Evan Rusackas, San Francisco, CA (US); Evan Jeng, Los Altos Hills, CA (US); Kaixiang Hu, Fremont, CA (US); William McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 503 days.

(21) Appl. No.: 15/463,077

(22) Filed: Mar. 20, 2017

(65) Prior Publication Data

US 2017/0272965 A1    Sep. 21, 2017

Related U.S. Application Data

(60) Provisional application No. 62/310,617, filed on Mar. 18, 2016.

(51) Int. Cl.
*H04W 24/08* (2009.01)
*H04W 24/04* (2009.01)
(Continued)

(52) U.S. Cl.
CPC ........... *H04W 24/08* (2013.01); *H04W 24/04* (2013.01); *H04W 48/16* (2013.01); *H04W 84/12* (2013.01)

(58) Field of Classification Search
CPC ..... H04W 24/08; H04W 48/16; H04W 24/04; H04W 84/12; G06F 3/0412; G06F 3/044;
(Continued)

(56) References Cited

U.S. PATENT DOCUMENTS 6,477,572 B1 * 11/2002 Elderton ................. H04L 41/22
709/224
6,654,803 B1 * 11/2003 Rochford ................ H04L 41/22
345/418

(Continued)

OTHER PUBLICATIONS

Wayback Machine, Wikipedia entry for Network topology, Nov. 7, 2015, whole document (Year: 2015).*

*Primary Examiner* — Benjamin H Elliott, IV
*Assistant Examiner* — Jose L Perez
(74) *Attorney, Agent, or Firm* — Clements Bernard Baratta; Lawrence A. Baratta, Jr.

(57) ABSTRACT

Systems and methods for visualization and troubleshooting of a distributed Wi-Fi network, implemented through one of a mobile application and a web page, include, responsive to obtaining data from the distributed Wi-Fi network, providing a map of the distributed Wi-Fi network based on the obtained data, wherein the map includes a first icon designating a gateway node, one or more second icons each designating one or more nodes, and connectors between the gateway node, wherein the gateway node and the one or more nodes are in a tree topology; providing a visualization in the map based on a current operational status of the distributed Wi-Fi network from the obtained data, wherein the visualization comprises a plurality of visual indicators of the current operational status; and providing notifications based on the current operational status.

19 Claims, 9 Drawing Sheets

(51) Int. Cl.
*H04W 48/16* (2009.01)
*H04W 84/12* (2009.01)

(58) Field of Classification Search
CPC ....... G06F 2203/04103; G06F 12/0804; G06F
12/0855; G06F 12/0862; G06F 12/0891;
G06F 16/2228; G06F 16/2379; G06F
16/2455; G06F 16/24578; G06F 16/248;
G06F 16/252; G06F 16/29; G06F 16/34;
G06F 16/9024; G06F 16/90335; G06F
16/93; G06F 16/951; G06F 16/9535;
G06F 17/212; G06F 1/163; G06F 1/1643;
G06F 21/572; G06F 2203/0331; G06F
2203/0384; G06F 2203/04101; G06F
2203/04108; G06F 2203/04111; G06F
2212/154; G06F 2212/6028; G06F
2212/62; G06F 3/014; G06F 3/0236;
G06F 3/03547; G06F 3/038; G06F 3/041;
G06F 3/0416; G06F 3/0445; G06F
3/0446; G06F 3/045; G06F 3/0482; G06F
3/04847; G06F 3/04886; G06F 3/1256;
G06F 9/4881; H04L 43/045; H04L 41/22;
H04L 67/36
See application file for complete search history.

(56) References Cited

U.S. PATENT DOCUMENTS

| | | | |
|---|---|---|---|
| 7,315,533 B2 | 1/2008 | Theobold et al. | |
| 7,414,978 B2 | 8/2008 | Lun et al. | |
| 7,953,403 B2 | 5/2011 | Nientiedt | |
| 8,798,021 B2 | 8/2014 | Mangalvedhe et al. | |
| 9,060,279 B2 | 6/2015 | Ganu et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,420,528 B2 | 8/2016 | Madan et al. | |
| 9,497,700 B2 | 11/2016 | Madan et al. | |
| 9,510,214 B1 | 11/2016 | Balasubramaniam et al. | |
| 9,516,579 B1 | 12/2016 | Diner et al. | |
| 9,807,629 B1* | 10/2017 | Varlakov | H04W 24/04 |
| 2003/0191608 A1* | 10/2003 | Anderson | G06T 11/206 |
| | | | 702/189 |
| 2004/0061701 A1* | 4/2004 | Arquie | H04L 43/0882 |
| | | | 345/440 |
| 2004/0157624 A1* | 8/2004 | Hrastar | H04L 41/0893 |
| | | | 455/456.1 |
| 2004/0203897 A1* | 10/2004 | Rogers | H04W 16/18 |
| | | | 455/456.1 |
| 2004/0210654 A1* | 10/2004 | Hrastar | H04L 41/12 |
| | | | 709/224 |
| 2004/0218609 A1* | 11/2004 | Foster | H04L 12/5692 |
| | | | 370/401 |
| 2005/0073521 A1* | 4/2005 | Watanabe | H04L 67/36 |
| | | | 345/440 |
| 2006/0258395 A1 | 11/2006 | Cave et al. | |
| 2007/0149172 A1 | 6/2007 | Dickinson | |
| 2007/0242621 A1 | 10/2007 | Nandagopalan et al. | |
| 2008/0049779 A1* | 2/2008 | Hopmann | H04L 12/2807 |
| | | | 370/431 |
| 2008/0209333 A1* | 8/2008 | Frei | G06T 11/206 |
| | | | 715/736 |
| 2008/0252527 A1* | 10/2008 | Garcia | G01S 1/68 |
| | | | 342/450 |
| 2009/0019152 A1* | 1/2009 | Huang | H04L 67/125 |
| | | | 709/224 |
| 2009/0257380 A1 | 10/2009 | Meier | |
| 2009/0279427 A1 | 11/2009 | Ji et al. | |
| 2009/0316585 A1 | 12/2009 | Srinivasan | |
| 2009/0323632 A1 | 12/2009 | Nix | |
| 2010/0122175 A1* | 5/2010 | Gupta | H04L 41/0893 |
| | | | 715/735 |
| 2011/0039554 A1 | 2/2011 | Bims | |
| 2011/0151886 A1 | 6/2011 | Grayson et al. | |
| 2012/0002567 A1 | 1/2012 | Sun et al. | |
| 2012/0009924 A1* | 1/2012 | Lee | H04M 1/7253 |
| | | | 455/434 |
| 2012/0087268 A1 | 4/2012 | Savoor et al. | |
| 2012/0122503 A1 | 5/2012 | Ma et al. | |
| 2012/0155278 A1* | 6/2012 | Itou | H04L 43/045 |
| | | | 370/241 |
| 2012/0257585 A1 | 10/2012 | Sydor et al. | |
| 2013/0201857 A1 | 8/2013 | Bhargava et al. | |
| 2013/0272285 A1 | 10/2013 | Goldsmith et al. | |
| 2014/0046983 A1* | 2/2014 | Galloway | G06F 16/29 |
| | | | 707/798 |
| 2014/0071967 A1* | 3/2014 | Velasco | H04L 12/1403 |
| | | | 370/338 |
| 2014/0092765 A1 | 4/2014 | Agarwal et al. | |
| 2014/0126410 A1 | 5/2014 | Agarwal et al. | |
| 2014/0280901 A1* | 9/2014 | Balachandran | H04W 24/04 |
| | | | 709/224 |
| 2014/0321325 A1* | 10/2014 | Jing | H04W 40/248 |
| | | | 370/254 |
| 2014/0328190 A1 | 11/2014 | Lord et al. | |
| 2014/0342724 A1* | 11/2014 | Hill | H04W 48/10 |
| | | | 455/419 |
| 2015/0016305 A1* | 1/2015 | Douer | H04W 48/16 |
| | | | 370/254 |
| 2016/0080949 A1 | 3/2016 | Chandrasekhar et al. | |
| 2016/0094398 A1* | 3/2016 | Choudhury | H04L 45/42 |
| | | | 370/254 |
| 2016/0105814 A1* | 4/2016 | Hurst | H04L 67/10 |
| | | | 370/252 |
| 2016/0239185 A1* | 8/2016 | Balimidi | G06F 3/0482 |
| 2016/0249241 A1* | 8/2016 | Barmettler | G06F 3/04815 |
| 2016/0373306 A1* | 12/2016 | Saha | H04L 41/12 |
| 2017/0078880 A1* | 3/2017 | Likar | H04L 63/08 |
| 2018/0035401 A1* | 2/2018 | Iijima | H04W 16/18 |

* cited by examiner

DISTRIBUTED WI-FI NETWORK VISUALIZATION AND TROUBLESHOOTING

CROSS-REFERENCE TO RELATED APPLICATION(S)

The present patent/application claims priority to U.S. Provisional Patent Application No. 62/310,617, filed Mar. 18, 2016, and entitled "DISTRIBUTED WI-FI NETWORK VISUALIZATION AND TROUBLESHOOTING," the contents of which are incorporated by reference.

FIELD OF THE DISCLOSURE

The present disclosure generally relates to wireless networking systems and methods. More particularly, the present disclosure relates to distributed Wi-Fi network visualization and troubleshooting.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method for visualization and troubleshooting of a distributed Wi-Fi network, implemented through one or more of a mobile application and a web page, includes, responsive to obtaining data from the distributed Wi-Fi network, providing a map of the distributed Wi-Fi network based on the obtained data, wherein the map comprises a first icon designating a gateway node, one or more second icons each designating one or more nodes, and connectors between the gateway node, wherein the gateway node and the one or more nodes are in a tree topology; providing a visualization in the map based on a current operational status of the distributed Wi-Fi network from the obtained data, wherein the visualization comprises one or more visual indicators of the current operational status; and providing notifications based on the current operational status. The notifications can include an indication of loss of connectivity between the Internet and the gateway node, and wherein one or more Wi-Fi client devices which support an alternate connection to the Internet are disconnected from the distributed Wi-Fi network based on the loss of connectivity. The method can further include performing one or more tests associated with the distributed Wi-Fi network and displaying associated results as part of the visualization in the map, wherein the one or more tests related to any of status and health of a broadband connection, Domain Name System (DNS), and throughput. The method can further include automatically switching to a different Domain Name System (DNS) responsive to a failure of the DNS.

The method can further include, responsive to a failure of connectivity between the Internet and the gateway node, utilizing one or more Wi-Fi client devices which support an alternate connection to the Internet as a hot spot to provide functionality of the gateway node in the distributed Wi-Fi network. The one or more visual indicators can include objects orbiting the first icon and/or the one or more second icons indicating clients. One or more of a speed and a shape of an orbit of the objects can be utilized to indicate any of activity, connection strength, bandwidth, and device transition between nodes. The method can further include providing an open Service Set Identifier (SSID) used solely for requesting guest access to the distributed Wi-Fi network; and one of allowing or blocking the guest request based on a response from an administrator, wherein, responsive to the allowing, a certificate is installed on a guest device associated with the guest request. The one or more visual indicators can include a plurality of: objects orbiting the first icon and/or the one or more second icons indicating clients; different sizes of the first icon and/or the one or more second icons based on the operational status; and different sizes of the connectors based on other operational status. The notifications can include dynamic changes in the visualization to replay changes in the distributed Wi-Fi network, wherein a rate of the dynamic changes can be adjustable or set to an appropriate rate for viewing by an administrator. The notifications can include nodes and/or clients having different visual characteristics based on usage rates. The notifications can include alerting an administrator of activity by nodes and/or clients which is inconsistent with past behavior.

In another exemplary embodiment, a user device configured to visualize and troubleshoot a distributed Wi-Fi network includes network interfaces supporting Wi-Fi and another connection to the Internet; one or more processors communicatively coupled to the network interfaces; and memory storing instructions that, when executed, cause the one or more processors to: responsive to obtaining data from the distributed Wi-Fi network, provide a map of the distributed Wi-Fi network based on the obtained data, wherein the map comprises a first icon designating a gateway node, one or more second icons each designating one or more nodes, and connectors between the gateway node, wherein the gateway node and the one or more nodes are in a tree topology; provide a visualization in the map based on a current operational status of the distributed Wi-Fi network from the obtained data, wherein the visualization comprises a one or more visual indicators of the current operational status; and provide notifications based on the current operational status. The notifications can include an indication of loss of connectivity between the Internet and the gateway node, and wherein one or more Wi-Fi client devices which support an alternate connection to the Internet are disconnected from the distributed Wi-Fi network based on the loss of connectivity.

The memory storing instructions that, when executed, can further cause the one or more processors to perform one or more tests associated with the distributed Wi-Fi network and displaying associated results as part of the visualization in the map, wherein the one or more tests related to any of status and health of a broadband connection, Domain Name System (DNS), and throughput. The memory storing instructions that, when executed, can further cause the one or more processors to automatically switch to a different Domain Name System (DNS) responsive to a failure of the DNS. The memory storing instructions that, when executed, can further cause the one or more processors to: responsive to a failure of connectivity between the Internet and the gateway node, utilize the another connection as a hot spot to provide functionality of the gateway node in the distributed Wi-Fi network. The one or more visual indicators can include objects orbiting the first icon and/or the one or more second icons indicating clients. One or more of a speed and a shape of an orbit of the objects can be utilized to indicate any of activity, connection strength, bandwidth, and device transition between nodes.

In a further exemplary embodiment, a non-transitory computer readable medium storing instructions configured to perform visualization and troubleshooting of a distributed Wi-Fi network, wherein the instructions, when executed, cause one or more processors to perform steps of: responsive to obtaining data from the distributed Wi-Fi network, providing a map of the distributed Wi-Fi network based on the obtained data, wherein the map comprises a first icon designating a gateway node, one or more second icons each designating one or more nodes, and connectors between the gateway node, wherein the gateway node and the one or more nodes are in a tree topology; providing a visualization in the map based on a current operational status of the distributed Wi-Fi network from the obtained data, wherein the visualization comprises a one or more visual indicators of the current operational status; and providing notifications based on the current operational status.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

Distributed Wi-Fi System

Figure 1:
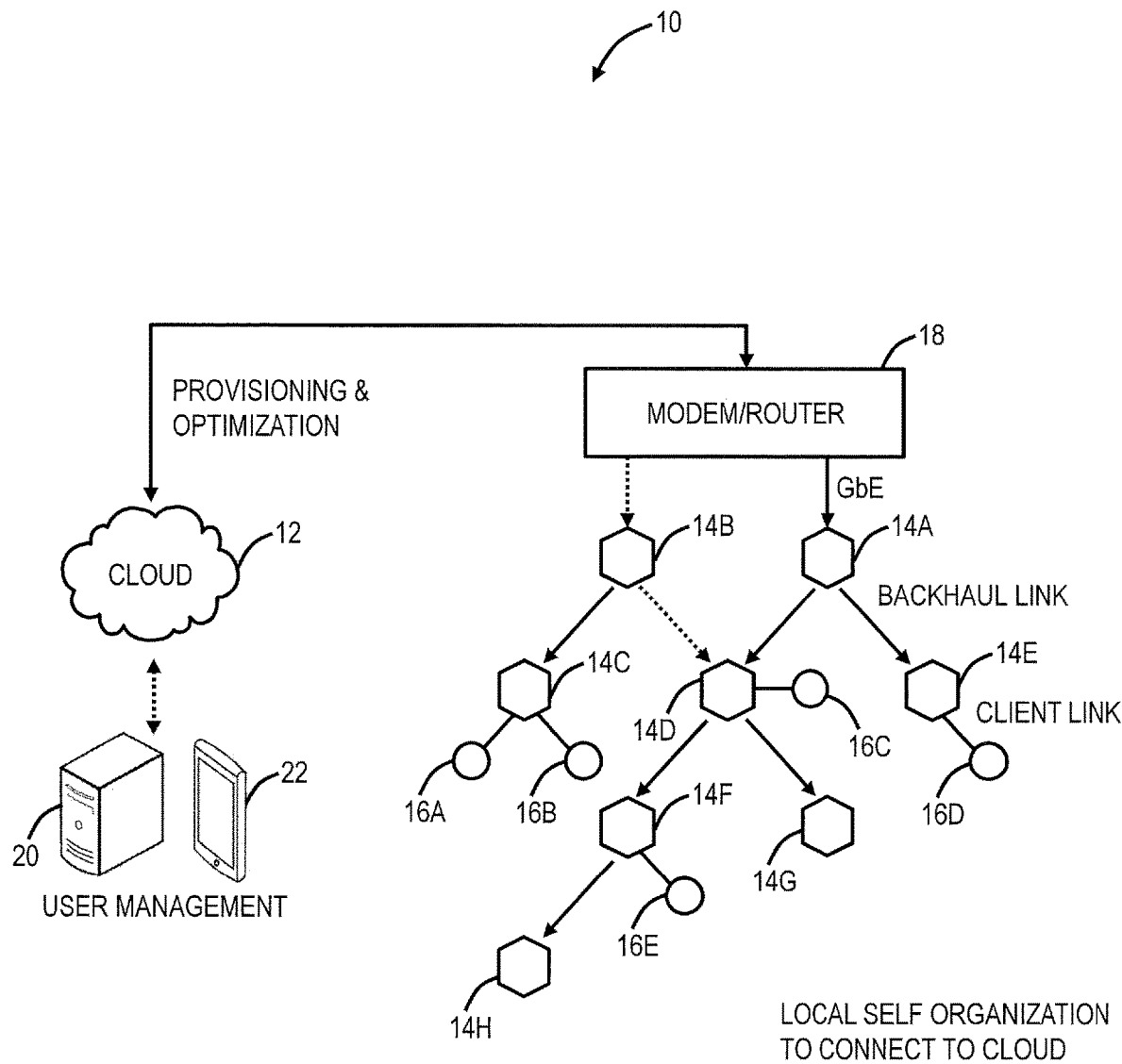
FIG. 1 is a network diagram of a distributed Wi-Fi system with cloud-based control.

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
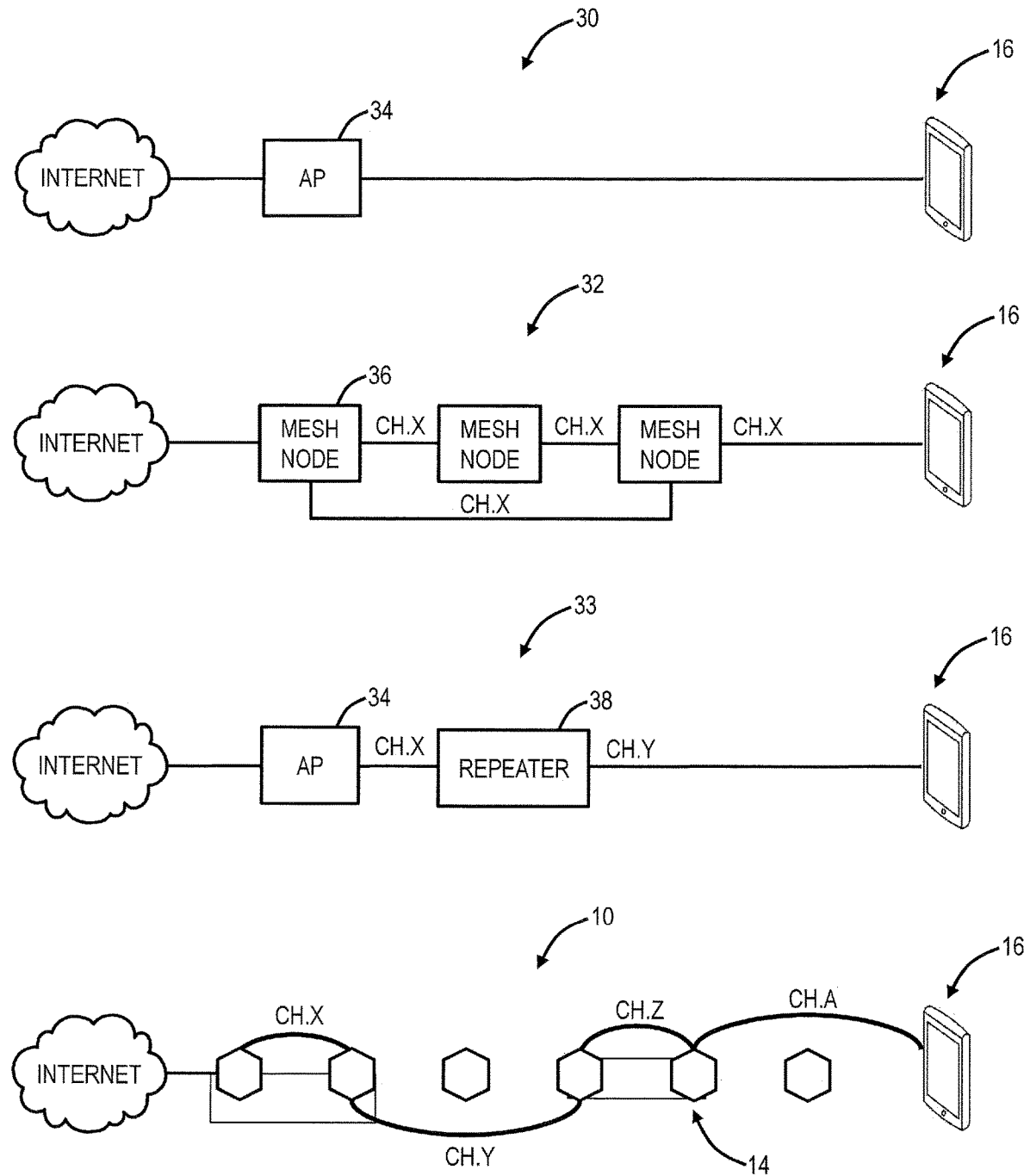
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
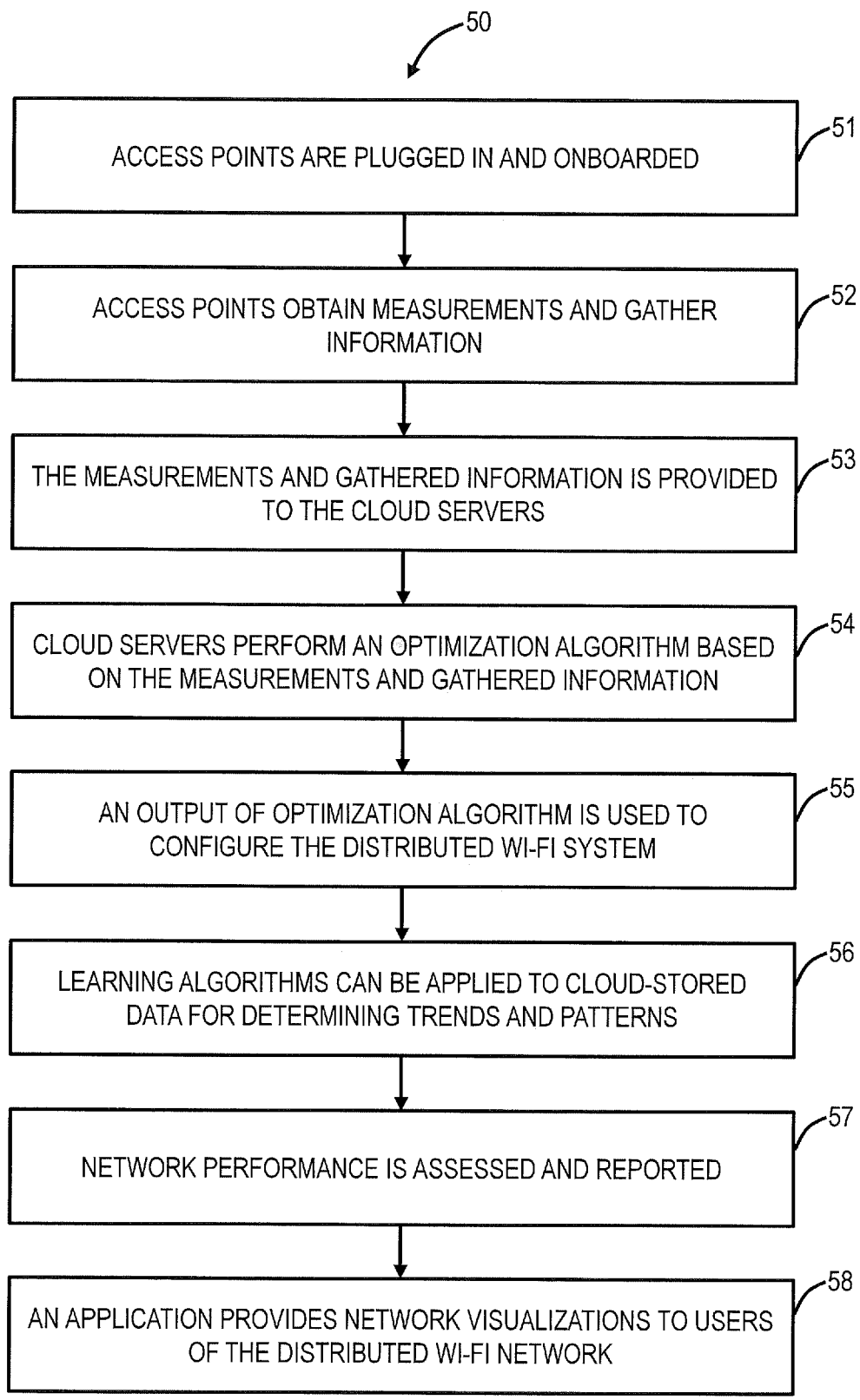
FIG. 3 is a flowchart of a configuration and optimization process for the distributed Wi-Fi system of FIG. 1.
Figure 4:
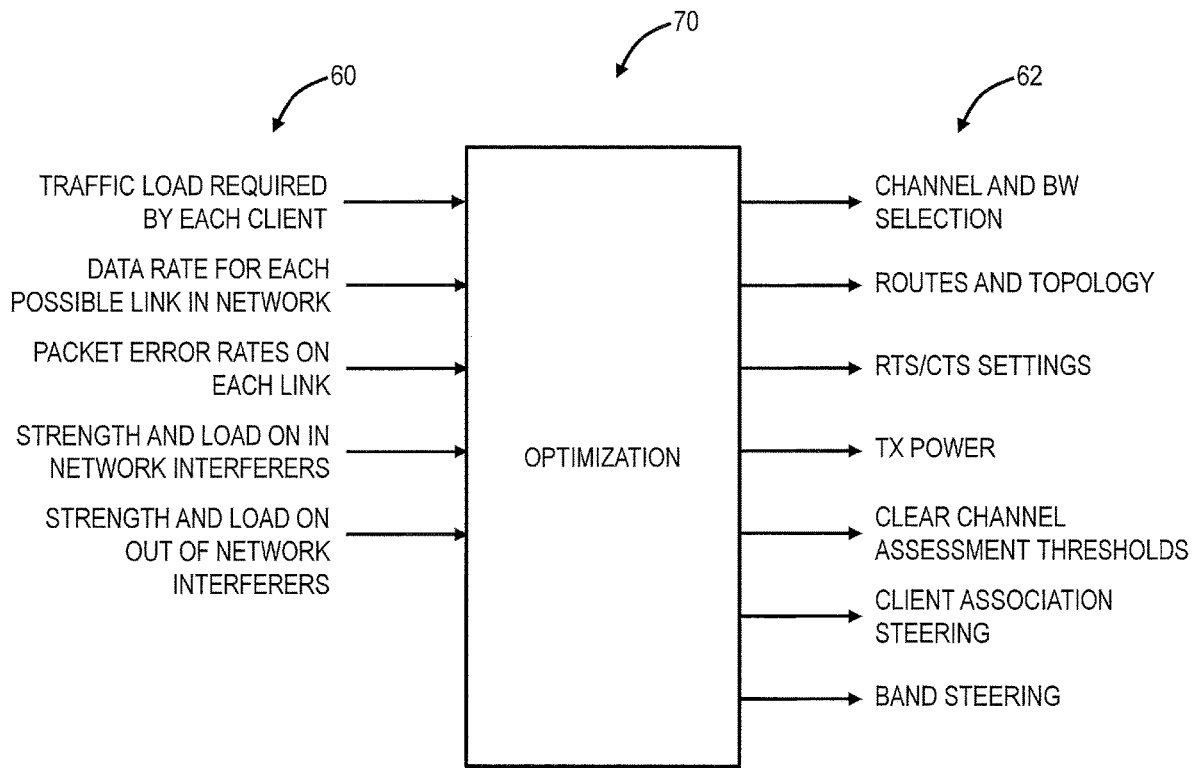
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers"). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
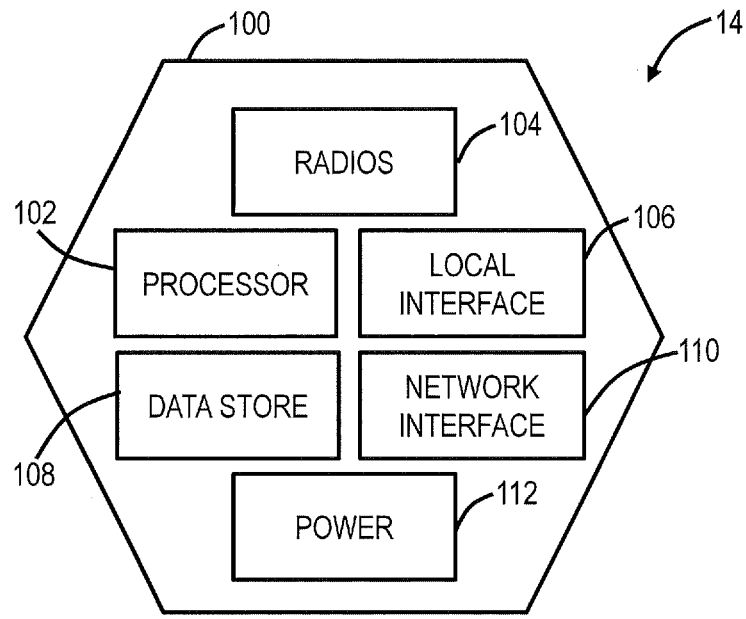
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
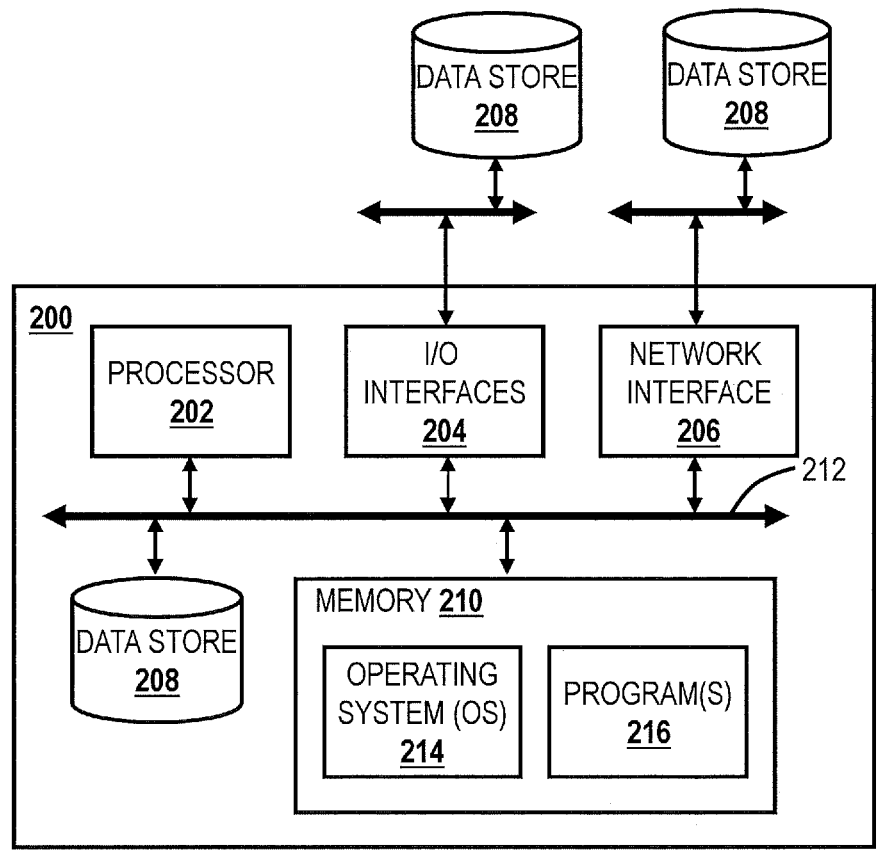
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Visualization of a Home Network

Again, Wi-Fi networks, or other similar wireless technologies, have become ubiquitous. People use them in their homes, at work, and in public spaces such as schools, cafes, even parks. Wi-Fi provides a great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. A proven solution to address performance in wireless networks is to provide more radios in a more tightly packed space to increase the spectral density and Radio Frequency (RF) power of the radio signal between sending and receiving devices. Monitoring a wireless network in the home is difficult because the environment is often dynamic and the technical understanding of the user may be limited. Therefore, various mechanisms of data visualization and network troubleshooting are implemented to improve the usability of the distributed Wi-Fi system 10. This information can be provided to the user through a web Graphical User Interface (GUI) or mobile GUI format, such as part of a mobile application operating on the user device 22.

Figure 7:
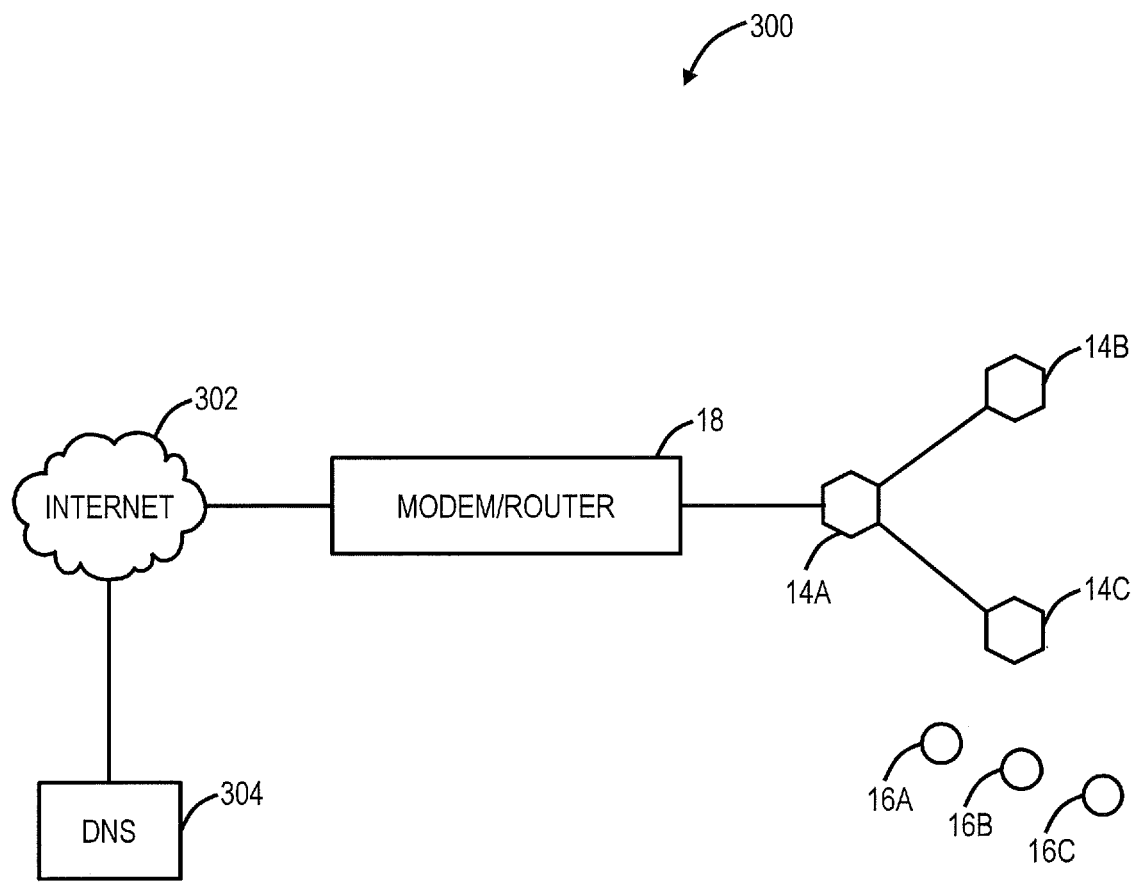
FIG. 7 is a network diagram of a Wi-Fi network for home use.

Referring to FIG. 7, in an exemplary embodiment, a network diagram illustrates a Wi-Fi network 300 for home use. The Wi-Fi network 300 can be the distributed Wi-Fi system 10 or the like. The Wi-Fi network 300 typically includes a gateway node 14A which connects to the Internet 302 and services such as a Domain Name System (DNS) 304, one or more nodes 14B, 14C which connect to the gateway node 14A for access to the Internet 302 and which provide services to Wi-Fi client devices 16, one or more Wi-Fi client devices 16A, 16B, 16C which are end devices that consume and generate data, and users which are operators of the Wi-Fi client devices 16. The users may be human or machines.

The gateway node 14A is the same as the nodes 14B, 14C with an additional connection to the Internet 302 via the modem/gateway 18. Additionally, the gateway node 14A can manage the interface between the Wi-Fi network 300 and the Internet 302. The nodes 14A, 14B, 14C are used to form the core of the Wi-Fi network 300 and operate in a relay function to pass data between Wi-Fi client devices 16 and other nodes 14, or from nodes 14 to other nodes 14, or from other nodes 14 to the gateway node 14A. The Wi-Fi client devices 16 connect to the nodes 14 to gain access to the Wi-Fi network 300. The Wi-Fi client devices 16 run applications and are the producers and consumers of data on the Wi-Fi network 300. They are end connections in the Wi-Fi network 300. The users are machines or humans controlling the Wi-Fi client devices 16 in the Wi-Fi network 300. An example of a user is a person using a cell phone (Wi-Fi client device 16) to access a web page or use a mobile app.

The visualization of the different components of the Wi-Fi network 300 is important to help the administrator or owner monitoring the Wi-Fi network 300 to consume large amounts of data visually to quickly understand the status, performance, and operation of the Wi-Fi network 300. Accordingly, systems and methods are described herein for displaying the Wi-Fi network 300 for visualization and troubleshooting.

Figure 8:
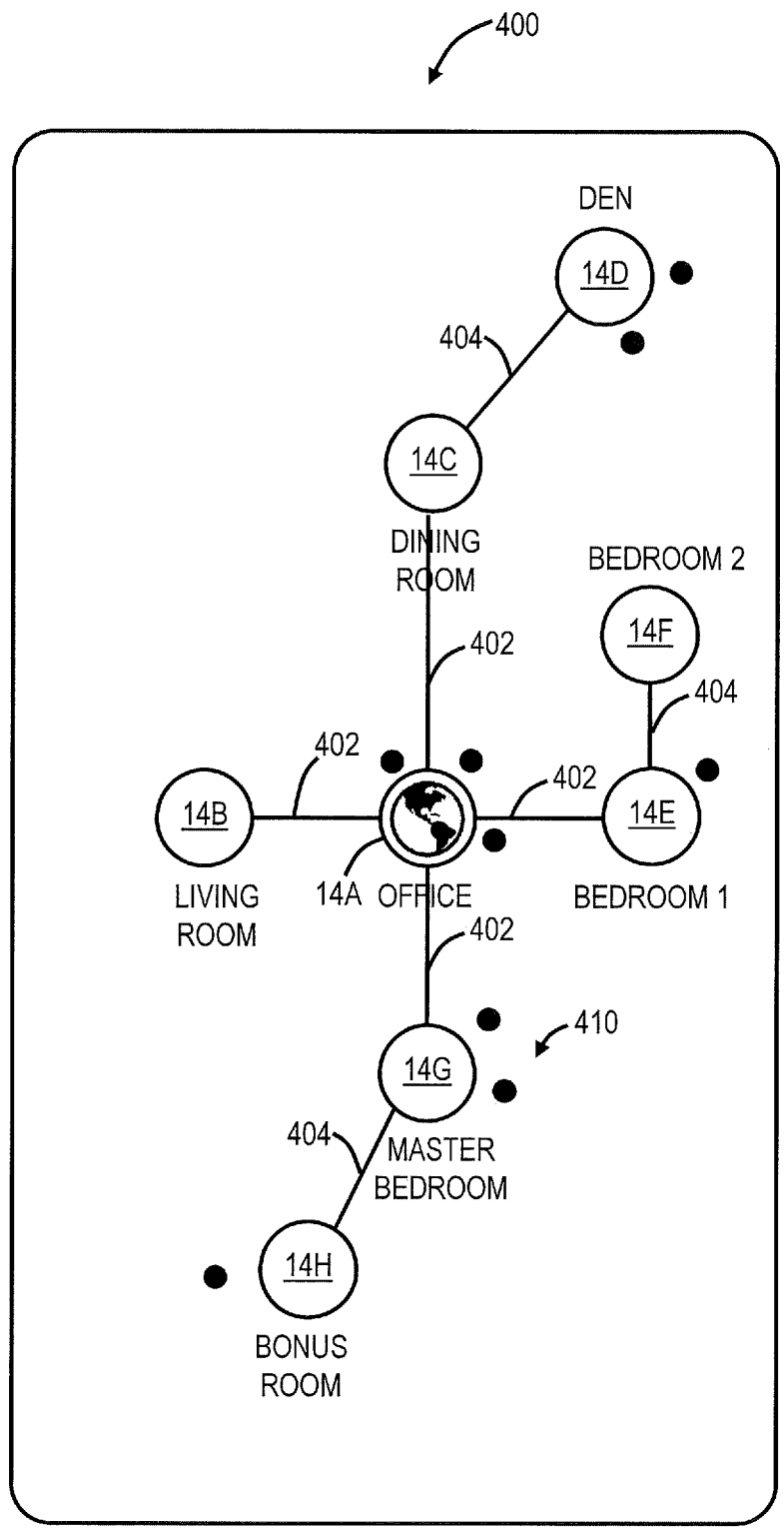
FIG. 8 is a screen shot of a Graphical User Interface (GUI) associated with a mobile application or webpage for visualizing and troubleshooting the Wi-Fi network of FIG. 7.

Referring to FIG. 8, in an exemplary embodiment, a screen shot illustrates a GUI 400 associated with a mobile application or web page for visualizing and troubleshooting the Wi-Fi network 300. The systems and methods described herein can be realized through a mobile application operating on the user device 22. Also, the systems and methods can be realized through a web page, e.g., HTML, accessible through any web browser. The GUI 400 provides a visualization of the Wi-Fi network 300, such as the distributed Wi-Fi system 10.

In the GUI 400, the Wi-Fi network 300 can be presented visually by centering the Wi-Fi network 300 around the gateway node 14A. The gateway node 14A is the sink and the source of almost all data since it is managing the connection with the Internet 302. In the GUI 400, the gateway node 14A can be shown as a circle or other shape to denote an entity in the Wi-Fi network 300. Typically, an icon in the shape of the earth or a globe with Internet connections encircling the globe can be used to denote the function of the gateway node 14A as the source and sink of all Internet-connected data. That is, there is some designation in the GUI 400 to set it apart from the other nodes. A network may have one or more the gateway nodes 14A.

Optionally, one or more nodes 14B-14H are connected to the gateway node 14A to form the Wi-Fi network 300. The connection between the gateway node 14A and adjacent nodes 14B, 14C, 14E, 14G are denoted by a connector 402. The connector 402 is typically a line of varying colors, opacity, length and continuity. The connector 402 signifies a data connection between the gateway node 14A and the adjacent nodes 14B, 14C, 14E, 14G. A node may also have connectors 404 to other nodes to extend the network. Similarly, the connector 404 can have varying colors, opacity, length and continuity as the connector 402. Specifically, the varying colors, opacity, length and continuity can designate visually operational aspects of the connectors 402, 404, such as data rate, load, channel, bandwidth, signal strength, etc.

A connector may also exist between two otherwise disjoint Wi-Fi networks (not shown in FIG. 8). A connector between networks is used to logically connect two physically or logically separate Wi-Fi networks with a path for data transferring between locations. A node 14 may have one or more connectors 402, 404 to another gateway node 14A or node 14.

In the GUI 400, the data visualization of the gateway node 14A and the nodes 14B-14H can have the following characteristics. The icon shape and illustration can denote the node type. For example, the gateway node 14A may be shown as an icon denoting a connection to the Internet 302, whereas the nodes 14B-14H may be shown to support internal connections only. The color of the icons can denote status. For example, a red color can denote a problem, whereas a white or green color denotes a well-performing node or gateway.

The opacity of the icon can denote the activity of the node or gateway in the transmission of data on the Wi-Fi network 300. If a gateway or node is missing, it can be shown as an outline of the original icon with different colors to show its status as missing (e.g., disconnected, loss of power, equipment fault, etc.). The size of the icon can be shown as larger or smaller based on the activity of data transmission or the number of other Wi-Fi client devices 16 or nodes 14 connected.

The name or nickname of the gateway or node can be shown in text form. The name may be determined by the administrator or owner of the Wi-Fi network or deducted through examination of the connected Wi-Fi client devices 16. For example, a node with the connection of Wi-Fi client devices 16 representing typical clients for a living room can be named "living room" to denote the space the gateway or node is located.

The connectors 402, 404 can be shown with different attributes to convey status, such as the length of the connector 402, 404; color, opacity, shape and thickness of the connector 402, 404; and animation of the connector 402, 404. The length of the connector 402, 404 can convey a physical distance between gateway or node, or a logical distance as measured by the signal levels on each end of the connector 402, 404. The color, opacity, shape and thickness of the connector 402, 404 can denote the strength of the connection. The animation of the connector 402, 404 can include an animation of data being sent on the connector 402, 404 represented by a bulge or pulse to show activity.

The Wi-Fi client devices 16 have an association with one node or gateway. A Wi-Fi client device 16 may move connections between nodes or gateway in the same Wi-Fi network based on the availability of different possible connections and the performance of the connections, such as based on the optimization 70 or other operating conditions. A Wi-Fi client device 16 connection to the nodes or gateway can be visualized as an object 410 orbiting around a larger object (i.e., the icon for the nodes 14), similar to a moon orbiting a planet. The orbiting object is the Wi-Fi client device 16, and the planet is the gateway or node.

The Wi-Fi client device 16 and node/gateway relationship can be visualized with the following attributes. The color of the clients can be used to convey status or type of the Wi-Fi client device 16. The orbit shape of the object 410 around the node or gateway can denote activity or type of application traffic being consumed or generated. The size of the object 410 can convey the capability or activity of the Wi-Fi client device 16. The distance of the object 410 to the node or gateway can denote the strength or quality of the connection. The speed of the orbit of the object 410 can show activity or speed. The opacity of the object 410 can show the activity or time connected to the node or gateway. Wi-Fi client devices 16 belonging as a guest of the network may be shown as a different icon, color, opacity, orbit or another identifiable characteristic to extinguish the guest client from a home client. A user of the Wi-Fi network 300 can own several Wi-Fi client devices 16; therefore, a client connected to the Wi-Fi network 300 may be represented as an icon representing the user instead of the client icon.

The icons, the connectors 402, 404, and the objects 410 can have one or more visual indicators associated therewith in the visualization. As described herein, different icon, color, shapes, sizes, opacity, orbit or another identifiable characteristics can be used to convey notifications associated with operation of the Wi-Fi network 300 to the user. Additionally, other notifications are also contemplated such as specific alarms or notifications (e.g., Internet connectivity lost, guest access request, DNS problems, etc.), numerical information (e.g., bandwidth, number of clients connected/disconnected, throughput, load), visualizations (e.g., heat maps of coverage, interference, etc.).

Heat Map

A heat map, denoted by gradients of color or opacity around the gateway, nodes, or clients, can be used to denote the performance or potential performance of the devices for a given time. A heat map is a quick way to tell the relative performance of devices in the Wi-Fi network 300 compared to others. The performance characteristic being compared could be related to signal strength, signal quality, speed, delay, packet loss, jitter, or other similar statistics.

A heat map of outside interference can also be visualized. Interference for wireless networks is a common occurrence, especially for unlicensed wireless networks like the Wi-Fi network 300. The duration and intensity of wireless interference can be visualized in the form of a heat map or discrete numbers to inform the administrator of the amount of interference on the Wi-Fi network 300. A node, gateway, or client suffering from interference can be illustrated by a higher gradient of color, for example. Devices with a lower level of interference can be illustrated with a lesser density of gradient.

Areas with Poor Performance

When a section of the Wi-Fi network 300 has poor performance, it can be visualized through an illustration showing a void or contrasting color of the affected area of the Wi-Fi network 300. The affected area of the Wi-Fi network 300 can be related to a physical location in space or a logical location. The affected area may be related to poor relative performance in signal strength, signal quality, speed, delay, packet loss, jitter or other similar statistics.

Time Scale

The visualization of data for the gateways, nodes, clients, and users is a dynamic environment, changing with the activity of the network. The changes in the Wi-Fi network 300 can be recorded and replayed based on a defined time limit or on an event basis. When a time limit is defined with a start and stop time, the Wi-Fi network 300 changes can be visually shown with different playback speeds. Similarly, events or major changes in the Wi-Fi network 300 can be isolated and replayed for the user or administrator to visualize changes and activity of the network.

Recovery from Internet Connection Failure with Redundant Connections

The user device 22 such as cellular phones and other similar clients have multiple communication interfaces, such as Wi-Fi and cellular. Each interface is capable of supporting an Internet connection simultaneously; however, client operating systems (OS) typically prefer one connection over the other because of cost, power, performance. or other similar reasons. In Wi-Fi networks, a connection to Wi-Fi does not necessarily mean a connection to the Internet 302. In many cases, a cellular phone OS is not equipped with the tools to disconnect a Wi-Fi connection in the case of an upstream Internet failure, leaving the Wi-Fi client device 16 unable to connect to the Internet 302 while connected successfully to the Wi-Fi network 300. In the case of a network with monitoring control of the gateway, an Internet outage is monitored.

A detected Internet outage in the Wi-Fi network 300 can result in the following actions. First, disconnect any Wi-Fi client devices 16 believed also to have an alternate data connection capable of accessing the Internet 302. This disconnection results in the cellular client to establish a connection to the Internet 302 through the cellular interface. Second, a push notification can be sent to the Wi-Fi client device 16 or the user device 22 operating the mobile application to monitor the Wi-Fi network 300 informing of the Internet outage. The push notification is received since the Wi-Fi client device 16 has been connected to the cellular connection for Internet connectivity.

Alternatively, in the case of a network gateway Internet outage, a client or node device with the capability of supporting simultaneous interface Internet connections can change operation to act as a gateway to the Wi-Fi network 300. As such, the client or node will provide gateway functions to other nodes and clients in the Wi-Fi network 300. The Internet connectivity will be established and shared by the newly formed gateway to provide Internet access to the Wi-Fi network 300 in a redundant fashion. In essence, this is a gateway failover mechanism.

Fault Isolation and Segmentation

Faults in the Wi-Fi network 300 can be measured through many monitoring points. The following items may be monitored and reported to the administrator or user, such as through the GUI 400, the mobile application, push notifications, etc. For example, speed and delay of the broadband ISP connection can be provided. If the speed is slow or the delay is long, it results in poor performance to the end clients and users. The DNS information can be provided. The DNS information used to translate Uniform Resource Locators (URLs) to Internet Protocol (IP) addresses for communications on the Internet 302. If the DNS is not operating correctly, the end user cannot use most Internet services. If an identified DNS is not operating, the address of the DNS server may be switch autonomously by the system to a known good DNS for processing of URL to IP address translations. This is a DNS failover mechanism.

The modem/gateway 18 in the Wi-Fi network 300 is responsible for segmenting the Internet connection from the home network connection. If the modem/gateway 18 is unresponsive or fails to maintain a connection to the Internet 302, the action is required to recover the modem service. An Internet outage, which is denoted by the lack of ability to talk to websites or other content on the Internet 302, can be detection from monitoring inside the Wi-Fi network 300 by checking connectivity to a well-known outside Internet address.

Throughput, delay, and packet loss are the cornerstone measurement parameters to determine if the correct amount of performance is being delivered to different nodes or clients. A home networking system should have the capability to measure each Key Performance Indicator (KPI), and in case the that the relative or absolute performance is below standard action can be taken to troubleshoot the problem.

The failure of a Client to connect to the Wi-Fi network 300 because of invalid authentication credentials may be the sign of a security attack. A notification to the administrator of the failed attack and a blocking of access by the affected client can be implemented to help prevent unwanted access.

Guest Access

Figure 9:
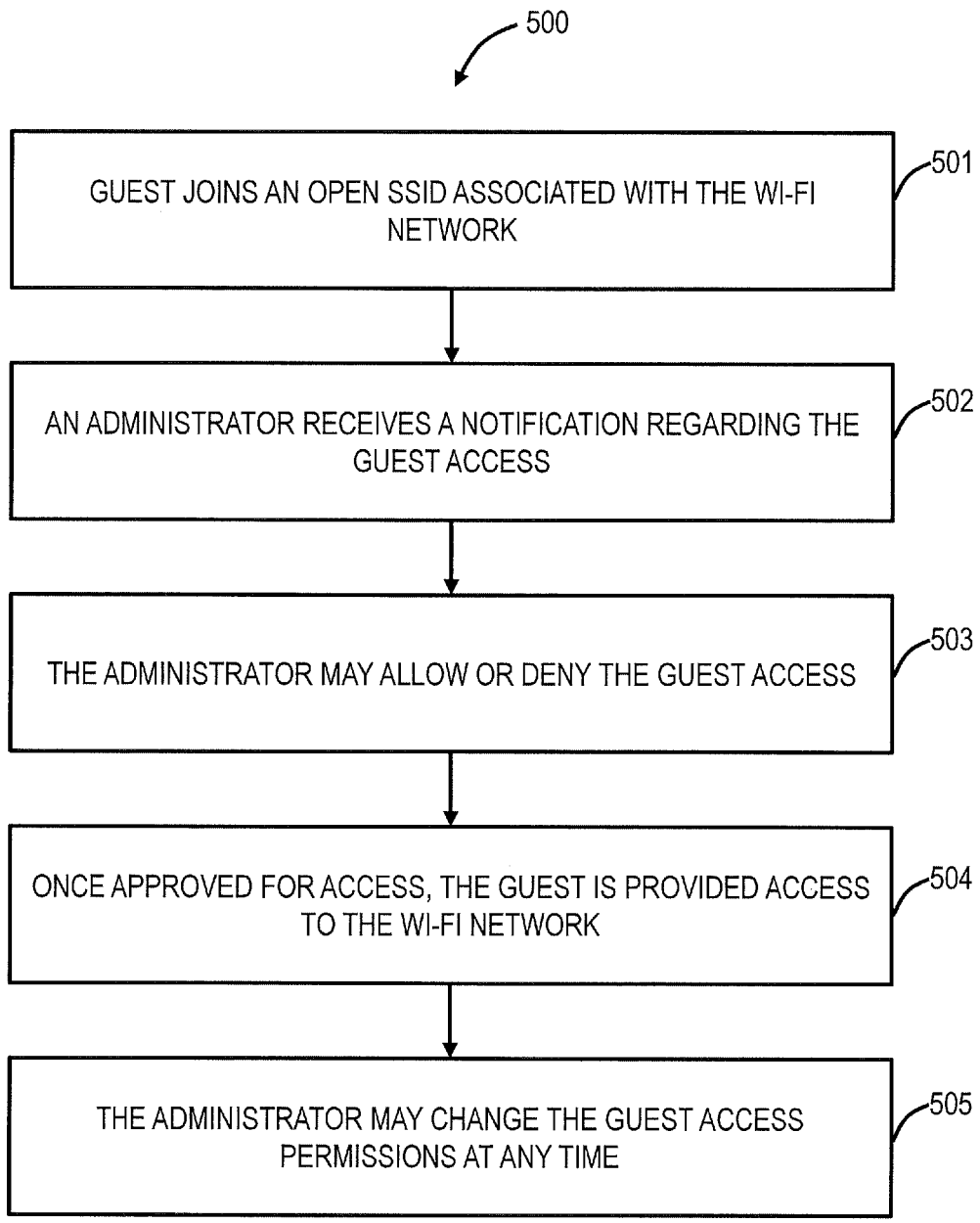
FIG. 9 is a flowchart of a guest access process for the Wi-Fi network of FIG. 7.

Referring to FIG. 9, in an exemplary embodiment, a flowchart illustrates a guest access process 500 for the Wi-Fi network 300. A guest may access the Wi-Fi network 300 with the required permissions, which are provided by the owner or administrator of the Wi-Fi network 300. For guest access, the Wi-Fi network 300 can include an open Service Set Identifier (SSID), and a guest can join the open SSID (step 501). The client device can inform the guest that they are a guest trying to access the Wi-Fi network 300, such as via a web page. A request to access the Wi-Fi network 300 is sent to an administrator. If desired or required, the requesting guest can add details about the request, including the guest's name and requirements for accessing the Wi-Fi network 300.

The administrator receives a notification regarding the guest access (step 502). The notification can be through the mobile application, text, email, or other mechanisms. The details about the guest can also be shown including the client type and hostname of the client. Additionally, any user added details could be displayed to the administrator. The administrator may allow or deny access to the Wi-Fi network 300 based on the information provided (step 503). If allowed, the administrator can set time limits and also limit the ability of the guest to access other clients on the Wi-Fi network 300. Additionally, the administrator can limit the applications to be run by the client.

Once approved for access, the guest client device will gain access to the Wi-Fi network 300 (step 504). The client device will display an option to make the connection secure by way of installation of a certificate to the guest client device. If accepted, the certificate will install, and the guest client device will be re-connected to the same SSID with a secure, encrypted connection. At any time, the administrator may change the permissions or block access to the guest client device (step 505).

Administrator-Initiated Access

Figure 10:
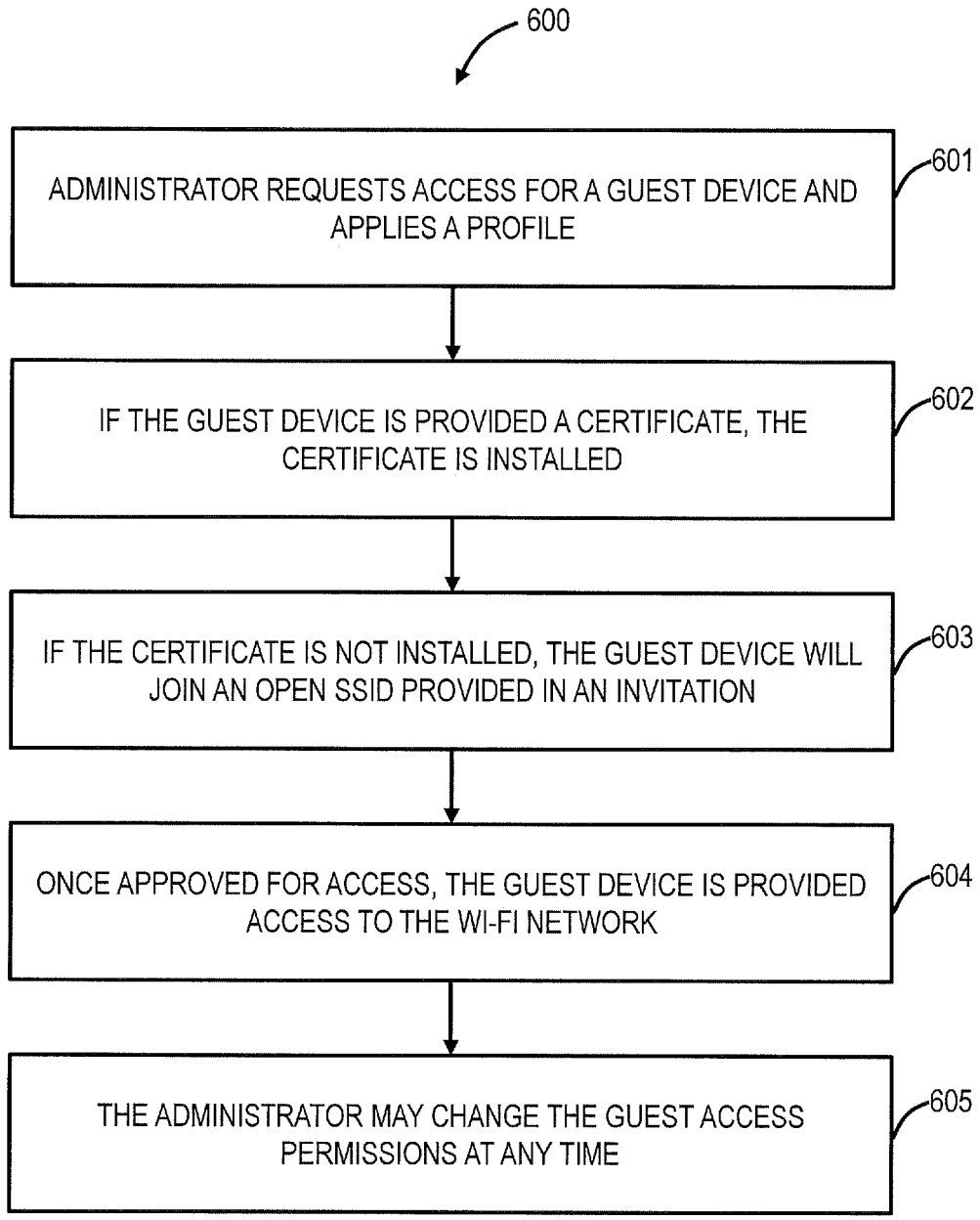
FIG. 10 is a flowchart of an administrator initiated guest access process for the Wi-Fi network of FIG. 7.

Referring to FIG. 10, in an exemplary embodiment, a flowchart illustrates an administrator initiated guest access process 600 for the Wi-Fi network 300. Also, the administrator may also invite a guest to access the Wi-Fi network 300 by sending a text, email, in-app message or other similar communication technique. The administrator will request access for a guest device and apply a profile for the guest (step 601). The profile provides information about the number of guest clients allowed, time limits, levels of access to other clients, bandwidth limits and speeds, requirements for encryption, allowed applications and other similar network access limitations. The invitation for the guest is sent to the user with either an URL link, a username, and password, or a certificate for access.

If the guest is sent a certificate, the certificate is installed on the client device (step 602). When the client device is within the range of the Wi-Fi network 300, the client device will securely join the Wi-Fi network 300 with the credentials embedded in the certificate. If a certificate is not installed on the guest client device, the guest will join an open SSID provided in the invitation sent to the client device (step 603). The guest client can then display the option to connect with the username/password or simply visit the URL provided in the invitation for access. A visit to the unique URL provided in the invitation is used as a "ticket" for entry to the network.

Once approved for access, the guest client device will gain access to the Wi-Fi network 300 (step 604). The client device will display an option to make the connection secure by way of installation of a certificate to the guest client device. If accepted, the certificate will install, and the guest client device will be re-connected to the same SSID with a secure, encrypted connection. At any time, the administrator may change the permissions or block access to the guest client device (step 605). As an optional method, the administrator can send a text message, email, in-app invitation, or another such mechanism to share the SSID and Pre-Shared Key (PSK) of a guest network. With such an invitation, the guest can simply join the SSID and PSK of the Wi-Fi network 300.

Authentication Based on Certificate

A certificate may be installed on a client device to gain access to the Wi-Fi network 300 with varying level of control. The certificate contains authentication requirements to join a Wi-Fi network 300 and is controlled by a centralized server, such as in the cloud 12 The profile from the certificate provides information about time limits, levels of access to other clients, bandwidth limits and speeds, requirements for encryption and other similar network access limitation. A certificate may be installed on a client device at any time, including during the manufacturing or distribution of the client. When the client is within the range of the target Wi-Fi network 300, it can automatically connect in a secure fashion and be subjected to the profile administered by a centralized server. The profile may change or be revoked at any time.

A two-step process may be put into place for authentication and claiming by an administrator. In this case, after access to the Wi-Fi network 300 is achieved with a certificate, the administrator may be required to perform a second step authentication by entering a code that is unique to the client to gain full access the Wi-Fi network 300.

Adaptive Security

An adaptive firewall setting can be applied to each client in the Wi-Fi network 300. Some clients require access to many ports and IP addresses to run a myriad of applications, such as a laptop computer or a cell phone. Other devices, such as Internet of Things (IoT) sensors, only need a small and usually fixed port range and IP address connectivity to pass their information to an outside server. The Wi-Fi network 300 can adaptively change these security settings by limiting the ports and URLs or IP addresses the client is allowed to communicate with through the gateway. These security settings can be learned over time or be applied at the time of the initial connection on a per client connection. If a client is trying to deviate from the prescribed firewall settings, a warning can be sent to the administrator to assess the risk. Additionally, the administrator may change the firewall settings at any time from a centralized server.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for visualization and troubleshooting of a distributed Wi-Fi network, implemented through one or more of a mobile application and a web page, the method comprising:

responsive to obtaining data from the distributed Wi-Fi network, providing a map of the distributed Wi-Fi network based on the obtained data, wherein the map comprises a first icon designating a gateway node that is connected to a modem/router, one or more second icons including at least one of a shape and illustration different than the first icon denoting a node type thereof, each designating one or more nodes that are indirectly connected to the modem/router via the gateway node, and connectors between the gateway node and the one or more nodes, wherein the gateway node and the one or more nodes are in a tree topology;

providing a visualization in the map based on a current operational status of the distributed Wi-Fi network from the obtained data, wherein the visualization comprises one or more visual indicators of the current operational status, the one or more visual indicators comprise objects orbiting the first icon and/or the one or more second icons indicating clients, and a speed of an orbit of the objects indicates one of an activity or connection speed of the clients indicated by the objects; and providing notifications based on the current operational status.

2. The method of claim 1, wherein the notifications comprise an indication of loss of connectivity between the Internet and the gateway node, and one or more Wi-Fi client devices which support an alternate connection to the Internet are disconnected from the distributed Wi-Fi network based on the loss of connectivity.

3. The method of claim 1, further comprising:
performing one or more tests associated with the distributed Wi-Fi network and displaying associated results as part of the visualization in the map, wherein the one or more tests are related to any of status and health of a broadband connection, Domain Name System (DNS), and throughput.

4. The method of claim 3, further comprising:
automatically switching to a different Domain Name System (DNS) responsive to a failure of the DNS.

5. The method of claim 1, further comprising:
responsive to a failure of connectivity between the Internet and the gateway node, utilizing one or more Wi-Fi client devices which support an alternate connection to the Internet as a hot spot to provide functionality of the gateway node in the distributed Wi-Fi network.

6. The method of claim 1, wherein a shape of an orbit of the objects is utilized to indicate any of activity, connection strength, bandwidth, and device connectivity that transitions between nodes.

7. The method of claim 1, further comprising:
providing an open Service Set Identifier (SSID) used solely for requesting guest access to the distributed Wi-Fi network; and
one of allowing or blocking the guest request based on a response from an administrator, wherein, responsive to the allowing, a certificate is installed on a guest device associated with the guest request.

8. The method of claim 1, wherein the one or more visual indicators comprise a plurality of:
different sizes of the connectors based on other operational status.

9. The method of claim 1, wherein the notifications comprise dynamic changes in the visualization to replay changes in the distributed Wi-Fi network, wherein a rate of the dynamic changes is adjustable by an administrator.

10. A user device configured to visualize and troubleshoot a distributed Wi-Fi network, the user device comprising:
network interfaces supporting Wi-Fi and another connection to the Internet;
one or more processors communicatively coupled to the network interfaces; and
memory storing instructions that, when executed, cause the one or more processors to:
responsive to obtaining data from the distributed Wi-Fi network, provide a map of the distributed Wi-Fi network based on the obtained data, wherein the map comprises a first icon designating a gateway node that is connected to a modem/router, one or more second icons including at least one of a shape and illustration different than the first icon denoting a node type thereof, each designating one or more nodes that are indirectly connected to the modem/router via the gateway node, and connectors between the gateway node and the one or more nodes, wherein the gateway node and the one or more nodes are in a tree topology;
provide a visualization in the map based on a current operational status of the distributed Wi-Fi network from the obtained data, wherein the visualization comprises one or more visual indicators of the current operational status, the one or more visual indicators comprise objects orbiting the first icon and/or the one or more second icons indicating clients, and a speed of an orbit of the objects indicates one of an activity or connection speed of the clients indicated by the objects; and
provide notifications based on the current operational status.

11. The user device of claim 10, wherein the notifications comprise an indication of loss of connectivity between the Internet and the gateway node, and one or more Wi-Fi client devices which support an alternate connection to the Internet are disconnected from the distributed Wi-Fi network based on the loss of connectivity.

12. The user device of claim 10, wherein the memory storing instructions that, when executed, further cause the one or more processors to:
perform one or more tests associated with the distributed Wi-Fi network and displaying associated results as part of the visualization in the map, wherein the one or more tests are related to any of status and health of a broadband connection, Domain Name System (DNS), and throughput.

13. The user device of claim 12, wherein the memory storing instructions that, when executed, further cause the one or more processors to:
automatically switch to a different Domain Name System (DNS) responsive to a failure of the DNS.

14. The user device of claim 10, wherein the memory storing instructions that, when executed, further cause the one or more processors to:
responsive to a failure of connectivity between the Internet and the gateway node, utilize the another connection as a hot spot to provide functionality of the gateway node in the distributed Wi-Fi network.

15. The user device of claim 10, wherein a shape of an orbit of the objects is utilized to indicate any of activity, connection strength, bandwidth, and device connectivity that transitions between nodes.

16. A non-transitory computer readable medium storing instructions configured to perform visualization and troubleshooting of a distributed Wi-Fi network, wherein the instructions, when executed, cause one or more processors to perform steps of:
responsive to obtaining data from the distributed Wi-Fi network, providing a map of the distributed Wi-Fi network based on the obtained data, wherein the map comprises a first icon designating a gateway node, one or more second icons including at least one of a shape and illustration different than the first icon denoting a node type thereof, each designating one or more nodes, and connectors between the gateway node, wherein the gateway node and the one or more nodes are in a tree topology;
providing a visualization in the map based on a current operational status of the distributed Wi-Fi network from the obtained data, wherein the visualization comprises one or more visual indicators of the current operational status, the one or more visual indicators comprise objects orbiting the first icon and/or the one or more second icons indicating clients, and a speed of an orbit of the objects indicates one of an activity or connection speed of the clients indicated by the objects; and
providing notifications based on the current operational status.

17. The method of claim 1, wherein a size of the second icon is changed to illustrate a number of Wi-Fi client devices or nodes connected to the node represented thereby.

18. The user device of claim 10, wherein a size of the second icon is changed to illustrate a number of Wi-Fi client devices or nodes connected to the node represented thereby.

19. The non-transitory computer readable medium of claim 16, wherein a size of the second icon is changed to illustrate a number of Wi-Fi client devices or nodes connected to the node represented thereby.

* * * * *